March 14, 1950 P. R. LEE 2,500,760
THERMOSTATIC SWITCH
Filed Oct. 9, 1945 2 Sheets-Sheet 1

WITNESSES:
Louis Necho
E. H. Lutz

INVENTOR
PAUL R. LEE
BY R. J. Eisinger
ATTORNEY

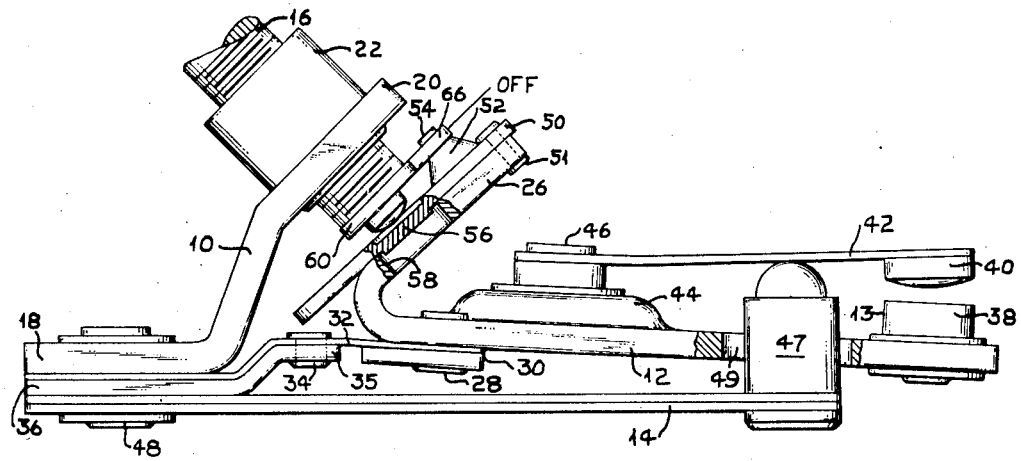

Patented Mar. 14, 1950

2,500,760

UNITED STATES PATENT OFFICE 2,500,760

THERMOSTATIC SWITCH

Paul R. Lee, Mansfield, Ohio, assignor to Westinghouse Electric Corporation, East Pittsburgh, Pa., a corporation of Pennsylvania Application October 9, 1945, Serial No. 621,362

5 Claims. (Cl. 200—138)

My invention relates to a thermostat which is adapted to open and close an electric circuit in response to changes in the temperature of a device or medium the temperature of which is to be controlled.

One object of the invention is to produce an improved thermostat of the type set forth.

A further object is to produce an improved thermostat which, in addition to being adjustable for different temperature settings, also has an "off" position in which the circuit to which the thermostat is connected is opened, and kept open, until the thermostat has again been adjusted to any desired setting.

A still further object is to produce an improved method of calibrating a thermostat of the type set forth.

A still further object of the invention is to produce an improved thermostat of the type set forth which can be accurately calibrated by the improved method forming part of the invention.

These and other objects are effected by my invention as will be apparent from the following description and claims taken in connection with the accompanying drawings, forming a part of this application, in which:

Fig. 5 is a view similar to Fig. 1, showing the thermostat in its "off" position;

Fig. 6 is a view similar to Figs. 1 and 5, illustrating one condition of the thermostat during calibration thereof;

Fig. 7 is a fragmentary view similar to Fig. 6 showing another condition of the thermostat during calibration thereof.

Figure 1:
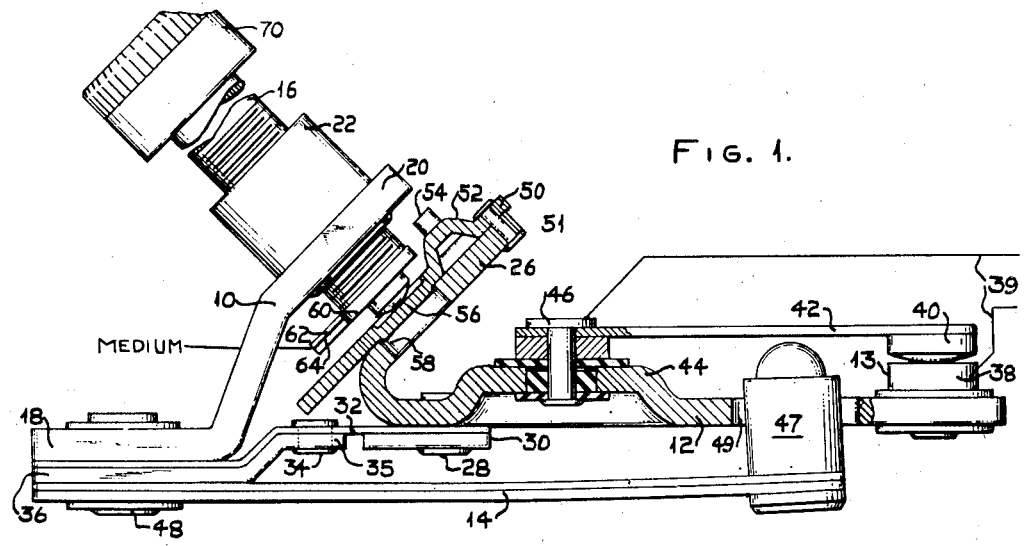
Fig. 1 is a view, partly in elevation and partly in vertical section, of a thermostat embodying my invention.

The embodiment illustrated in the drawings includes a rigid supporting bracket 10, a rigid arm 12 hingedly secured to said bracket and carrying a normally closed switch 13 for controlling an electric circuit, a bimetal member 14 also carried by said bracket and operative, in response to predetermined temperature values, to open said switch, and an adjusting mechanism including an adjusting screw 16 for varying the relation of the arm 12 to the bimetal member to vary the temperature value at which the bimetal will open the switch. The adjusting mechanism also includes means adapted to cooperate with the adjusting screw for opening and keeping the switch open, independently of the operation of the bimetal member, so as to provide an "off" position for the thermostat.

The bracket 10 includes an end portion 18 to which other parts of the thermostat assembly are secured and by means of which the thermostat assembly as a whole may be secured to an apparatus the temperature of which is to be controlled, such, for example, as the soleplate of an electrically-heated flatiron or the like. The bracket 10 also includes an offset end portion 20 which is spaced from, and disposed at an angle to, the plane of the portion 18. The bracket portion 20 carries an internally-threaded bushing 22 which is engaged by the adjusting screw 16. In the illustrated embodiment, the bushing and the adjusting screw are provided with cooperating left hand threads. The thermostat also includes an arm 26 which is carried by, or formed integral with, the arm 12. The arm 26 is disposed near, and in a plane generally parallel to, the plane of the bracket portion 20 and supports a part of the adjusting mechanism.

The arm 12 is secured by a rivet or the like 28 and a backing or reinforcing washer 30 to a leaf spring hinge member 32. The spring hinge member 32 is secured by a rivet 34 to a raised end portion 35 of a rigid supporting plate 36 which extends parallel to the bracket portion 18. The spring hinge member 32 is so constructed that it tends to bias or rotate the arm 12, in counter-clockwise direction as viewed in the drawings, about a fulcrum adjacent the rivet 34.

The switch 13 includes a fixed contact 38 carried at the end of the arm 12, in electrically-insulated relation thereto, and a movable contact 40 carried by one end of a spring arm 42, the other end of which is secured in electrically-insulated relation to an intermediate portion 44 of the arm 12, by a rivet 46. The spring contact arm 42 is so constructed that it biases the movable contact 40 in switch-closing direction, or in clockwise direction as viewed in the drawings. For convenience in effecting a proper spacing of the spring 42 from the juxtaposed portion of the arm 12, the intermediate portion 44, to which the spring contact arm is secured, is humped or raised, as best shown in Fig. 1. The contacts 38 and 40 are connected to an electric circuit to be controlled by means of wires 39.

The bimetal 14 is of any well-known construction and carries at one end thereof a switch-opening pin 47 which is either formed of insulating material, or which is electrically insulated from the bimetal member. The other end of the bimetal member and the corresponding ends of the spring 32 and the plate 36 are secured to the bracket portion 18 by any suitable means such as a rivet 48. The bimetal member is so constructed that, under the usually prevailing ambient temperature, it will assume, and remain in, the flat position shown in Fig. 5, and will, when heated, arch upwardly, as viewed in the drawings, so as to separate the contacts 38 and 40 of the switch. The pin 47 is movable toward, and away from, the spring arm 42, through an opening 49 formed in the arm 12. For the purpose of this specification, the flat position of Fig. 5 will be referred to as the "cold" position of the bimetal.

The adjusting mechanism also includes a plate 50 which is welded, riveted or otherwise secured, as at 51, to the arm 26 and which carries a cam 52 and a stop 54. As will be seen from Fig. 4, the cam 52 is preferably formed by striking up a portion of the body of the plate 50, and has an end portion bent to form the stop 54. The plate 50 is provided with a central dished portion 56 which is adapted to seat in a recess or opening 58 formed in the arm 26, for a purpose hereinafter set forth.

The adjusting mechanism still further includes means carried by the adjusting screw 16 for limiting the range of adjustment and for opening the switch and preventing it from being closed even though the bimetal member is in the "cold" position of Fig. 5. As shown, the adjustment range-limiting and switch-opening means is in the nature of a plate or mutilated washer 60 permanently secured to the end of the screw 16 and including a flange or segment 62. The segment 62 has one edge 64 thereof tapered or slanted so as to ride on the cam 52 and abut one side of the stop 54 to open and keep the switch open, and has an opposite edge 66 adapted to abut the other side of the stop 54 to determine a maximum temperature setting for the thermostat.

Figure 8:
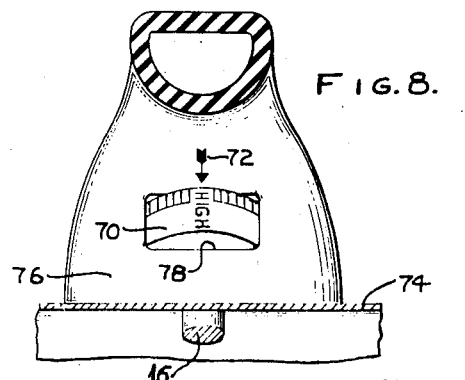
Fig. 8 is a fragmentary view showing the adjusting knob and coacting index for indicating the setting to which the thermostat has been adjusted.

The adjusting screw 16 is provided with an operating knob 70 which is provided with suitable graduations adapted to coact with a fixed index 72. The knob 70 is located in a conveniently accessible and visible position with reference to the apparatus to which the thermostat is applied. As shown in Fig. 8, the thermostat is applied to an electric flatiron 74, only the upper portion of which is diagrammatically and fragmentarily illustrated. When applied to this type of apparatus, the upper portion of the screw is disposed in the front portion 76 of the iron handle, with the actuating knob 70 rotatable in, and projecting through, an opening 78 formed in the handle. The index 72 is carried by the adjacent portion of the handle and may be in the nature of a marking stamped thereon, or in the nature of a pointer secured to the handle adjacent the opening 78. The graduations on the knob 70 may be expressed in terms of degrees of temperature, or the knob may be marked at suitable intervals with the legends "Low," "Medium," "High," etc. If desired, the graduations can also be expressed in terms of the material to be ironed, such as "Rayon," "Cotton," "Wool," "Linen," etc.

Operation

Figure 2:
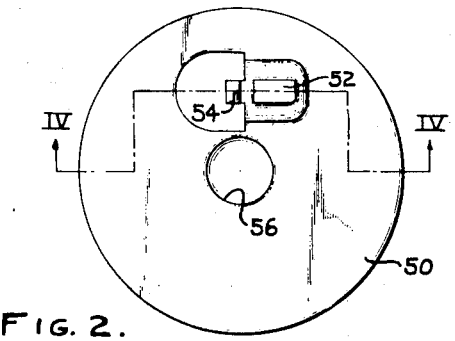
Figs. 2 and 3 are top plan views of certain details forming a part of the construction.
Figure 4:
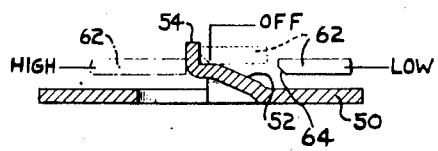
Fig. 4 is a section along line IV—IV of Fig. 2.

When it is desired to open the switch and keep it open, the adjusting screw is turned, in counterclockwise direction with reference to the plate 50 as shown in Fig. 2, until the slanted edge 64 of the segment 62 rides on the cam 52 and abuts the adjacent side of the stop 54, as shown in dotted line position of the segment which is marked "Off" in Fig. 4. As will be seen from Fig. 5, when the segment 62 rides on the cam 52, the arm 12 is moved downwardly relative to the bimetal member. The pin 47, being freely movable through the opening 49, does not interfere with the movement of the arm 12. However, when the arm 12 is moved downwardly to a sufficient extent, the pin 47 obstructs the spring arm 42 and prevents it from moving downwardly with the arm 12, thus opening the switch, as shown in Fig. 5, even though the bimetal member is in its flat or "cold" position. In this position of the adjusting screw, the switch will remain open under any ambient temperature to which the thermostat is apt to be subjected.

When it is desired to place the thermostat in position for automatic operation, the adjusting screw is turned in clockwise direction, until the segment 62 rides off the cam 52. If the adjusting screw is turned only far enough to cause the segment to ride off the cam so that the segment is in the solid line position marked "Low" in Fig. 4, the arm 12 will still be inclined downwardly, though to a less extent than it would be when the segment 62 rides on the cam 52, and the temperature of the apparatus to be controlled will be maintained at a relatively low value. This is due to the fact that the downward inclination of the arm 12 by the adjusting screw reduces the upward travel of the pin 47 necessary to open the switch.

When it is desired to maintain the temperature of the apparatus at a predetermined maximum value, the adjusting screw 16 is turned further in clockwise direction until the edge 66 of the segment 62 abuts the other side of the stop 54, as shown in Fig. 7 and by the dotted line position of the segment marked "High" in Fig. 4. In this position, the adjusting screw is backed off or moved away from the plate 50, thus permitting the spring hinge member 32 to bias the arm 12 upwardly to the extent permitted by the position of the screw which in turn is determined by the position of the stop 54. This increases the distance which the pin 47 has to travel before it can open the switch, and the apparatus will be raised to a temperature high enough to produce the necessary curvature in the bimetal member before the switch will be opened.

It will be understood that the adjusting screw can be moved to any intermediate position between "High" and "Low," as for example, the position marked "Medium" in Fig. 1, in which the segment 62 is about half-way between the high and low positions, and in which the arm 12 is in a substantially straight or horizontal position.

When the thermostat is adjusted to any position other than its "Off" position, it will cycle so as to maintain the apparatus to be controlled at the selected temperature. For example, if the apparatus to be controlled is to be maintained at a medium temperature, and if the screw 16 is so adjusted, the bimetal member 14 will, when the selected temperature has been reached, arch upwardly sufficiently to engage and move the spring arm 42 upwardly to separate the contacts 38 and 40. This opens the circuit, thus allowing the apparatus to cool. When the temperature of the apparatus has reached a predetermined low value, the bimetal member resumes its flat condition, thus permitting the spring arm 42 to bias the contact 40 into engagement with the contact 38 to re-energize the circuit.

Calibration

Figure 3:
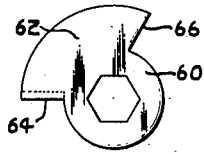

In order to calibrate the thermostat, the plate 50 is positioned loosely on the arm 26 and is retained in this position by engagement of the dished portion 56 thereof with the opening 58, and by frictional engagement with the end of the adjusting screw. The adjusting screw is now turned in clockwise direction, or is backed off with respect to the plate 50, so as to permit the spring hinge member 32 to bias the arm 12 upwardly to the desired extent as shown in Fig. 6. For example, if it is desired to provide the thermostat with a maximum temperature setting of 500° F., the adjusting screw is backed off enough to insure that the bimetal member will not curve enough to open the switch unless subjected to a temperature in excess of 500° F. Since there is no need for accuracy in setting this preliminary upper limit, the extent to which the screw is backed off may be roughly gauged. The thermostat is then heated up to 500° F. by any suitable means, as for example, by immersion in a bath having a controlled constant temperature of 500° F. When the bimetal member has been heated to the temperature of the bath, the adjusting screw is turned in the direction to depress the arm 12 until the spring arm 42 abuts the pin 47 and is moved upwardly enough to open the switch as shown in exaggerated fashion in Fig. 6. When this takes place, the thermostat is removed from the hot bath and allowed to cool. The plate 50 is then rotated in the appropriate direction (clockwise as seen in Figs. 3 and 4) until the edge 66 of the segment 62 abuts the side of the stop 54 remote from the cam 52, or to the position shown in Fig. 7 and by the dot and dash line position of the segment marked "High" in Fig. 4. The plate is then riveted or otherwise permanently secured to the arm 26 to fix the maximum temperature setting of the thermostat. With the adjusting screw in this position, the knob 70 is secured to the end of the screw with the portion of the knob marked "High" in registration with the index 72.

It will be apparent that the above described calibration also determines the minimum setting or lower temperature limit of the thermostat, since the cam 52, which determines the same, is adjusted at the same time.

It will thus be seen that a thermostat embodying my invention, in addition to being adjustable to maintain different selected temperatures, is also provided with an "Off" position. Also, a thermostat calibrated according to my invention, and under controlled conditions, will operate accurately in actual use. It is further pointed out that the thermostat, except for securing the plate 50 in position, is completely assembled before it is calibrated so that the calibration of the bimetal is not in any way affected by subsequent application of the thermostat to the apparatus, the temperature of which is to be controlled.

While I have shown my invention in but one form, it will be obvious to those skilled in the art that it is not so limited, but is susceptible of various changes and modifications without departing from the spirit thereof.

What I claim is:

1. A thermostat comprising a supporting bracket structure having an offset portion, a rigid arm, a switch carried by one end of said arm and including a fixed contact and a movable contact, the other end of said arm including a bent portion disposed in a plane substantially parallel to the plane of said offset portion, a spring hinging said arm to the supporting bracket structure and biasing said arm to move said bent portion in the direction of said offset portion, a bimetal member carried by said supporting bracket structure and disposed adjacent said arm, said bimetal member being adapted, when heated, to move said movable contact away from said fixed contact to open said switch, an adjustment screw carried by said offset portion and adapted, when turned in a first direction, to bear upon said bent portion to move said arm toward said bimetal member to decrease the curvature of said bimetal member necessary to open said switch and adapted, when turned in the opposite direction, to permit said spring to bias said arm away from said bimetal member to increase the curvature of said bimetal member necessary to open said switch, a cam carried by said bent portion, a stop carried by said bent portion, and a member carried by the adjacent end of said screw and having a tapered edge portion adapted, when the screw is turned in said first direction, to ride on said cam to depress said arm and cause said bimetal member, while in its unheated condition, to open said switch, said member also having an opposite edge portion adapted, when said screw is turned in said opposite direction, to abut said stop and limit the movement of said arm away from said bimetal member to fix a maximum temperature setting for said switch.

2. The combination with a thermostatic switch adapted to be opened and closed in response to predetermined temperature values, of an arm movable in a first direction to increase, and in a second direction to decrease, the temperature value at which said switch will be opened, the movement of said arm in said second direction to a predetermined extent being adapted to cause the switch to be opened regardless of the prevailing temperature value, a spring biasing said arm in said first direction, an adjusting screw adapted, when turned in one direction, to move said arm in said second direction, and adapted when turned in the opposite direction, to permit said spring to move said arm in said first direction, a plate carried by said arm and including a cam and a stop disposed adjacent said cam, and a member carried by said screw and adapted, when said screw is turned in said one direction, to ride on said cam to move said arm in said second direction to said predetermined extent to open said switch, said member being adapted, when said screw is turned in said opposite direction, to abut said stop and limit the movement of said arm in said first direction to fix a maximum temperature setting for said switch.

3. The combination with a thermostat including a support, a bimetal member carried by said support, a movable arm disposed adjacent said bimetal member and connected to said support, a switch including a fixed contact carried by said arm and a movable contact, said bimetal member being adapted, when heated, to curve toward said arm and move said movable contact away from said fixed contact to open said switch, said arm being biased away from said bimetal member, an adjusting screw carried by said support, said screw being adapted, when rotated in a first direction, to move said arm towards said bimetal member to decrease the curvature of the bimetal member necessary to cause it to open said switch, and adapted, when turned in a second direction, to permit said arm to move away from said bimetal member to increase the curvature of the bimetal member necessary to open said switch, of means for opening said switch regardless of the temperature of the bimetal member and for limiting the maximum temperature at which said bimetal member will open said switch, said means including a cam carried by said arm, a stop also carried by said arm, and a member carried by the adjusting screw and adapted, when said screw is turned in said first direction, to ride on said cam and move said arm towards said bimetal member to cause the bimetal member to open said switch, and adapted, when the screw is turned in said second direction, to engage said stop and limit the movement of said arm away from said bimetal member to fix a maximum temperature setting of said switch.

4. The combination with a thermostatic switch adapted to be opened and closed in response to predetermined temperature values, of an arm movable in a first direction to increase, and in a second direction to decrease, the temperature value at which said switch will be opened, a spring biasing said arm in said first direction, and an adjusting screw adapted, when turned in one direction, to move said arm in said second direction, and adapted, when turned in the opposite direction, to permit said spring to move said arm in said first direction, a plate interposed between said screw and said arm, said plate and said arm having cooperating projection and recess disposed concentrically of the axis of said screw, said plate having a stop thereon, and a member carried by said screw and adapted, when said screw is turned in one direction, to abut said stop to limit the rotative movement of said screw in one direction to determine a temperature limit for the thermostatic switch.

5. The combination with a thermostatic switch adapted to be opened and closed in response to predetermined temperature values, of an arm movable in a first direction to increase, and in a second direction to decrease, the temperature value at which said switch will be opened, a spring biasing said arm in said first direction, and an adjusting screw adapted, when turned in one direction, to move said arm in said second direction, and adapted, when turned in the opposite direction, to permit said spring to move said arm in said first direction, a plate interposed between said screw and said arm, said plate and said arm having cooperating projection and recess of a form which permits rotation of said plate relative to said arm about the axis of said screw but prevents movement of said plate transversely of said axis, said plate having a stop thereon, and a member carried by said screw and adapted, when said screw is turned in one direction, to abut said stop.

PAUL R. LEE.

REFERENCES CITED

The following references are of record in the file of this patent:

UNITED STATES PATENTS

| Number | Name | Date |
| --- | --- | --- |
| 1,955,091 | Raney | Apr. 17, 1934 |
| 2,288,384 | Batchelor | June 30, 1942 |
| 2,310,791 | Keene | Feb. 9, 1943 |